(12) United States Patent
Agrawal et al.

(10) Patent No.: US 8,401,987 B2
(45) Date of Patent: Mar. 19, 2013

(54) MANAGING VALIDATION MODELS AND RULES TO APPLY TO DATA SETS

(75) Inventors: Geetika Agrawal, San Jose, CA (US); Jacques Joseph Labrie, Sunnyvale, CA (US); Mary Ann Roth, San Jose, CA (US); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 11/779,251

(22) Filed: Jul. 17, 2007

(65) Prior Publication Data

US 2009/0024551 A1    Jan. 22, 2009

(51) Int. Cl.
*G06N 5/00* (2006.01)
(52) U.S. Cl. .......................... 706/47; 706/45
(58) Field of Classification Search ............. 706/47, 706/45
See application file for complete search history.

(56) References Cited

U.S. PATENT DOCUMENTS

| | | | |
|---|---|---|---|
| 5,594,900 A | 1/1997 | Cohn et al. |
| 5,615,341 A | 3/1997 | Agrawal et al. |
| 5,675,785 A | 10/1997 | Hall et al. |
| 5,692,107 A | 11/1997 | Simoudis et al. |
| 5,794,209 A | 8/1998 | Agrawal et al. |
| 5,806,066 A | 9/1998 | Golshani et al. |
| 5,809,297 A | 9/1998 | Kroenke et al. |
| 5,813,002 A | 9/1998 | Agrawal et al. |
| 5,943,667 A | 8/1999 | Aggarwal et al. |
| 5,978,796 A | 11/1999 | Malloy et al. |
| 6,026,392 A | 2/2000 | Kouchi et al. |

(Continued)

FOREIGN PATENT DOCUMENTS

| | | |
|---|---|---|
| CN | 1435781 A | 8/2003 |
| CN | 1145901 C | 4/2004 |

(Continued)

OTHER PUBLICATIONS

Nesvizhskii, et al, Dynamic Spectrum Quality Assessment and Iterative Computational Analysis of Shotgun Proteomic Data, Molecular & Cellular Proteomics, vol. 5, Apr. 1, 2006, pp. 652-670.*

(Continued)

*Primary Examiner* — Wilbert L Starks
(74) *Attorney, Agent, or Firm* — David W. Victor; Konrad, Raynes, Davda & Victor LLP

(57) ABSTRACT

Provided are a method, system, and article of manufacture for managing validation models and rules to apply to data sets. A schema definition describing a structure of at least one column in a first data set having a plurality of columns and records providing data for each of the columns is received. At least one model is generated, wherein each model asserts conditions for at least one column in a record of the first data set. The schema definition and the at least one model are stored in a data quality model. Selection is received of a second data set and the data quality model. A determination is made as to whether a structure of the second data set is compatible with the schema definition in the selected data quality model. Each model in the data quality model is applied to the records in the second data set to validate the records in the second data set in response to determining that the structure of the second data set and the schema definition are compatible.

30 Claims, 5 Drawing Sheets

U.S. PATENT DOCUMENTS

| | | |
|---|---|---|
| 6,049,797 A | 4/2000 | Guha et al. |
| 6,078,918 A | 6/2000 | Allen et al. |
| 6,092,064 A | 7/2000 | Aggarwal et al. |
| 6,112,198 A | 8/2000 | Lohman et al. |
| 6,182,070 B1 | 1/2001 | Megiddo et al. |
| 6,185,549 B1 | 2/2001 | Rastogi et al. |
| 6,226,649 B1 | 5/2001 | Bodamer et al. |
| 6,272,478 B1 | 8/2001 | Obata et al. |
| 6,278,997 B1 | 8/2001 | Agrawal et al. |
| 6,301,575 B1 | 10/2001 | Chadha et al. |
| 6,311,173 B1 | 10/2001 | Levin et al. |
| 6,311,179 B1 | 10/2001 | Agarwal et al. |
| 6,317,735 B1 | 11/2001 | Morimoto |
| 6,339,775 B1 | 1/2002 | Zamanian et al. |
| 6,393,424 B1 | 5/2002 | Hallman et al. |
| 6,542,881 B1 | 4/2003 | Meidan et al. |
| 6,594,653 B2 | 7/2003 | Colby et al. |
| 6,604,095 B1 | 8/2003 | Cesare et al. |
| 6,609,123 B1 | 8/2003 | Cazemier et al. |
| 6,836,773 B2 | 12/2004 | Tamayo et al. |
| 6,850,947 B1 | 2/2005 | Chung et al. |
| 6,877,012 B2 | 4/2005 | Ashida et al. |
| 6,941,303 B2 | 9/2005 | Perrizo |
| 6,954,756 B2 | 10/2005 | Arning et al. |
| 6,965,888 B1 | 11/2005 | Cesare et al. |
| 6,973,459 B1 | 12/2005 | Yarmus |
| 7,007,020 B1 | 2/2006 | Chen et al. |
| 7,028,288 B2 | 4/2006 | Wall et al. |
| 7,249,118 B2 | 7/2007 | Sandler et al. |
| 7,266,537 B2 | 9/2007 | Jacobsen et al. |
| 7,426,520 B2 | 9/2008 | Gorelik et al. |
| 7,490,106 B2 | 2/2009 | Dumitru et al. |
| 7,680,828 B2 | 3/2010 | Gorelik |
| 7,836,004 B2 | 11/2010 | Roth et al. |
| 8,166,000 B2 | 4/2012 | Labrie et al. |
| 8,171,001 B2 | 5/2012 | Roth et al. |
| 2002/0091707 A1 | 7/2002 | Keller |
| 2002/0178170 A1 | 11/2002 | Britton et al. |
| 2003/0115280 A1 | 6/2003 | Quine et al. |
| 2003/0191667 A1 | 10/2003 | Fitzgerald et al. |
| 2003/0212678 A1 | 11/2003 | Bloom et al. |
| 2003/0217069 A1 | 11/2003 | Fagin et al. |
| 2004/0093344 A1 | 5/2004 | Berger et al. |
| 2004/0093559 A1 | 5/2004 | Amaru et al. |
| 2004/0189708 A1 | 9/2004 | Larcheveque et al. |
| 2004/0226002 A1 | 11/2004 | Larcheveque et al. |
| 2005/0055369 A1 | 3/2005 | Gorelik et al. |
| 2005/0060313 A1 | 3/2005 | Naimat et al. |
| 2005/0066240 A1 | 3/2005 | Sykes et al. |
| 2005/0066263 A1 | 3/2005 | Baugher |
| 2005/0108631 A1 | 5/2005 | Amorin et al. |
| 2005/0144552 A1 | 6/2005 | Kalthoff et al. |
| 2005/0182739 A1 | 8/2005 | Dasu et al. |
| 2005/0234688 A1 | 10/2005 | Pinto et al. |
| 2005/0256892 A1 | 11/2005 | Harken |
| 2006/0004740 A1 | 1/2006 | Dettinger et al. |
| 2006/0053382 A1 | 3/2006 | Gardner et al. |
| 2006/0136461 A1 | 6/2006 | Lee et al. |
| 2006/0136462 A1 | 6/2006 | Campos et al. |
| 2006/0167579 A1 | 7/2006 | Fujii et al. |
| 2006/0253435 A1 | 11/2006 | Nishizawa et al. |
| 2006/0271528 A1 | 11/2006 | Gorelik |
| 2006/0274760 A1 | 12/2006 | Loher |
| 2007/0073688 A1 | 3/2007 | Fry |
| 2007/0106785 A1 | 5/2007 | Tandon |
| 2007/0179959 A1 | 8/2007 | Sharma et al. |
| 2007/0239769 A1 | 10/2007 | Fazal et al. |
| 2007/0294221 A1 | 12/2007 | Chen et al. |
| 2008/0085742 A1 | 4/2008 | Karukka et al. |
| 2009/0094274 A1 | 4/2009 | Gorelik et al. |
| 2009/0327208 A1 | 12/2009 | Bittner et al. |

FOREIGN PATENT DOCUMENTS

| | | |
|---|---|---|
| WO | 0175679 A1 | 10/2001 |
| WO | 02073468 A1 | 9/2002 |
| WO | 2005027019 | 3/2005 |

OTHER PUBLICATIONS

Peim, et al., Estimating the Quality of Answers When Querying Over Description Logic Ontologies, Data & Knowledge Engineering, 47, 2003, pp. 105-129.*

Data Mining Group, "Association Rules" [online], [Retrieved on Nov. 1, 2006]. Retrieved from the Internet at <URL: http://www.dmg.org/v3-1/AssociationRules.html>, 7 pp.

Data Mining Group, "Trees" [online], [Retrieved on Nov. 1, 2006]. Retrieved from the Internet at <URL: http://www.dmg.org/v3-1/TreeModel.html>, 18 pp.

Han, E.H., G. Karypis, and V. Kumar, "Scalable Parallel Data Mining for Association Rules", 1997 ACM, Proceedings of the 1997 ACM SIGMOD International Conference on Management of Data, pp. 277-288.

Hipp, J., U. Guntzer, & U. Grimmer, "Data Quality Mining—Making A Virtue of Necessity", Proceedings of the 6th ACM SIGMOD Workshop on Research Issues in Data Mining and Knowledge Discovery, 2001, pp. 52-57.

Korn, F., A. Labrinidis, Y. Kotidis, & C. Faloutsos, "Quantifiable Data Mining Using Ratio Rules", The VLDB Journal, 2000, pp. 254-266.

Marcus, A., J.I. Maletic, & K. Lin, "Ordinal Association Rules for Error Identification in Data Sets", Proceedings of the Tenth International Conference on Information and Knowledge Management, 2001, pp. 589-591.

Morgan, Reish, Stone, Swearingen, "Implementation of Comprehensive Qualification and Validation of Entry Fields", TDB vol. 38, No. 2, Feb. 1995, pp. 317-318.

Muller, H., U. Leser, & J. Freytag, "Mining for Patterns in Contradictory Data", Proceedings of the 2004 International Workshop on Information Quality in Information Systems, 2004, pp. 51-58.

Pudi, V., "Data Mining—Association Rules", [online], [retrieved on Nov. 1, 2006], retrieved from the Internet at <URL: http://www.iiit.ac.in/~vikram/mining.html>, 3 pp.

Seekamp, C. and K. Britton, "Dynamic Generation of Rules from Properties to Improve Rule Processing Performance", RD No. 429, Jan. 2000, pp. 172.

Shipway and Tricker, "Data Validation and Correction by Context", TDB Sep. 1971, pp. 1132-1137.

U.S. Appl. No. 11/609,307, filed Dec. 11, 2006, entitled "Using a Data Mining Algorithm to Discover Data Rules", invented by Roth, M.A., B.H. Chard, Y. Saillet, & H.C. Smith, 36 pp.

U.S. Appl. No. 11/769,634, filed Jun. 27, 2007, entitled "Using a Data Mining Algorithm to Generate Rules Used to Validate a Selected Region of a Predicted Column", invented by Roth, M.A. & Y. Saillet, 42 pp.

U.S. Appl. No. 11/769,639, filed Jun. 27, 2007, entitled "Using a Data Mining Algorithm to Generate Format Rules Used to Validate Data Sets", invented by J.J. Labrie, D. Meeks, M.A. Roth, & Y. Saillet, 30 pp.

Wikipedia, "Decision Tree", [online], [retrieved on Nov. 1, 2006], retrieved from the Internet at <URL: http://en.wikipedia.org/w/index.php?title=Decision_tree&printable=yes>, 7 pp.

Wikipedia, "N-gram", [online], [retrieved on May 13, 2007]. Retrieved from the Internet at <URL: http://en.wikipedia.org/wiki/N-gram>, 3 pp.

Janta-Polczynski, M. and E. Roventa, "Fuzzy Measures for Data Quality", 18th International Conference of the North American Fuzzy Information Processing Society, Jul. 1999, pp. 398-402.

Marchetti, C., M. Mecella, M. Scannapieco, and A. Virgillito, "Enabling Data Quality Notification in Cooperative Information Systems through a Web-Service Based Architecture", Proceedings of the Fourth International Conference on Web Information Systems Engineering, 2003, 4pp.

Wang, R.Y., H.B. Kon, and S.E. Madnick, "Data Quality Requirements Analysis and Modeling", Proceedings of the Ninth International Conference on Data Engineering, 1999, pp. 670-677.

Knobbe, A.J., "Multi-Relational Data Mining", Nov. 22, 2004, 130 pp.

Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, vol. 5, Iss. 6, Dec. 1993, pp. 950-964.

U.S. Appl. No. 12/165,549, filed Jun. 30, 2008, entitled "Discovering Transformations Applied to a Source Table to Generate a Target Table", invented by T. Bittner, H. Kache, M.A. Roth, & Y. Saillet, 49 pp.

Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm &printible=yes>, 3 pp.

Williams, J., "Tools for Traveling Data", [online], Jun. 1997, [retrieved on Mar. 25, 2008], retrieved from the Internet at <URL: http://www.dbmsmag.com/9706d16.html>, 10 pp.

Office Action 1, Apr. 14, 2011, for U.S. Appl. No. 11/769,639, Total 36 pp.

Amendment 1, Aug. 6, 2009, for U.S. Appl. No. 11/609,307, Total 16 pp.

Amendment 2, Mar. 10, 2010, for U.S. Appl. No. 11/609,307, Total 11 pp.

Final Office Action 1, Dec. 10, 2009, for U.S. Appl. No. 11/609,307, Total 10 pp.

Notice of Allowance 1, Apr. 19, 2010, for U.S. Appl. No. 11/609,307, Total 11 pp.

Notice of Allowance 2, Jun. 28, 2010, for U.S. Appl. No. 11/609,307, Total 9 pp.

Office Action 1, Apr. 7, 2011, for U.S. Appl. No. 11/769,634, Total 40 pp.

Office Action 1, Mar. 30, 2011, for U.S. Appl. No. 12/165,549, Total 39 pp.

Office Action 1, Apr. 6, 2009, for U.S. Appl. No. 11/609,307, Total 26 pp.

English Abstract for CN1435781A, published Aug. 13, 2003, 1 p.
English Abstract for CN1145901C, published Apr. 14, 2004, 1 p.
Jingyi, D., "Survey of Association Rule Data Mining", © 1994-2009 China Academic Journal Electronic Publishing House, Total 2 pp [with English Abstract on p. 1].

Amendment 1, Jul. 7, 2011, for U.S. Appl. No. 11/769,634, filed Jun. 27, 2007 by M.A. Roth et al., Total 17 pp.

Amendment 1, Jul. 14, 2011, for U.S. Appl. No. 11/769,639, filed Jun. 27, 2007, by J.J. Labrie et al., Total 16 pp.

Amendment 1, Jun. 30, 2011, for U.S. Appl. No. 12/165,549, filed Jun. 30, 2008, by T. Bittner et al., Total 19 pp.

Final Office Action, Sep. 22, 2011, for U.S. Appl. No. 12/165,549, filed Jun. 30, 2008, by T. Bittner et al., Total 31 pp.

Notice of Allowance 1, Sep. 20, 2011, for U.S. Appl. No. 11/769,634, filed Jun. 27, 2007 by M.A. Roth et al., Total 19 pp.

Notice of Allowance 1, Sep. 22, 2011, for U.S. Appl. No. 11/769,639, filed Jun. 27, 2007, by J.J. Labrie et al., Total 19 pp.

Notice of Allowance, Oct. 27, 2009, for U.S. Appl. No. 11/499,442, filed Aug. 4, 2006 by A. Gorelik et al., Total 27 pp.

Office Action 1, Sep. 11, 2007, for U.S. Appl. No. 10/938,205, filed Sep. 9, 2004 by A. Gorelik et al., Total 19 pp. [250214-1020 (OA10].

Office Action 1, Aug. 29, 2012, for U.S. Appl. No. 13/267,292, filed Oct. 6, 2011 by A. Gorelik et al., Total 23 pp. [57.304D1 (OA1)].

Office Action 1, Mar. 5, 2009, for U.S. Appl. No. 11/499,442, filed Aug. 4, 2006 by A. Gorelik et al., Total 22 pp. [EXE001 (OA1)].

Preliminary Amendment, Oct. 6, 2011, for U.S. Appl. No. 13/267,292, filed Oct. 6, 2011 by A. Gorelik et al., Total 8 pp. [57.304D1 (PrelimAmend)].

Restriction Requirement, Jul. 9, 2012, for U.S. Appl. No. 13/267,292, filed Oct. 6, 2011 by A. Gorelik et al., Total 8 pp. [57.304D1 (RstReq)].

Response to Restriction Requirement, Aug. 9, 2012, for U.S. Appl. No. 13/267,292, filed Oct. 6, 2011 by A. Gorelik et al., Total 1 p. [57.304D1 (RspRstReq)].

Informatica, The Data Integration Company, "Enterprise Data Integration—Maximizing the Business Value of your Enterprise Data", Feb. 24, 2006, Total 9 pp.

Kach, H., Y. Saillet, and M. Roth, "Transformation Rule Discovery through Data Mining", 2008 ACM, VLDB '08, Aug. 24-30, 2008, VLDB Endowment, Total 4 pp.

Notice of Allowance 2, Dec. 14, 2011, for U.S. Appl. No. 11/769,639, filed Jun. 27, 2007 by J.J. Labrie et al., Total 15 pp. [57.142 (NOA2)].

Notice of Allowance 2, Dec. 28, 2011, for U.S. Appl. No. 11/769,634, filed Jun. 27, 2007 by M.A. Roth et al., Total 15 pp. [57.143 (NOA2)].

U.S. Appl. No. 13/435,352, filed Mar. 30, 2012, entitled "Discovering Pivot Type Relationships Between Database Objects", invented by Burda, L., S. Datta, A. Gorelik, D. Ren, and L.M. Tsentsiper, Total 48 pp. [57.300 (Appln)].

Saracco, C.M., J. Labrie, and S. Brodsky, [online]. Retrieved from the Internet at <URL: http://www.ibm.com/developerworks/data/library/techarticle/dm-0407saracco/>, "Using Service Data Objects with Enterprise Information Integration Technology", IBM, Jul. 1, 2004, pp. 1-14. [Also Total 14 pp].

Baldwin, R.T., "Views, Objects, and Persistence for Accessing a High Volume Global Data Set", National Climatic Data Center, © 2003, Total 5 pp.

"Procedure Oriented Programming (POP) vs Object Oriented Programming (OOP)", [online], [Retrieved on Oct. 10, 2012]. Retrieved from the Internet at <URL: http://hacksnpasses.blogspot.com/2011/05/procedure-oriented-programmingpop-vs.html>, Thursday, May 26, 2011, Total 8 pp.

Amendment 1, Jan. 11, 2008, for U.S. Appl. No. 10/938,205, filed Sep. 9, 2004 by Gorelik et al., Total 34 pp. [EXE-002 (Amend1)].

Amendment 1, Jul. 6, 2009, for U.S. Appl. No. 11/499,442, filed Aug. 4, 2006 by Gorelik, A., Total 27 pp. [EXE001 (Amend1)].

Amendment 1, Jul. 26, 2011, for U.S. Appl. No. 12/283,477, filed Sep. 12, 2008 by Gorelik et al., Total 21 pp.

Amendment 2, Nov. 9, 2011, for U.S. Appl. No. 12/283,477, filed Sep. 12, 2008 by Gorelik et al., Total 4 pp.

Notice of Allowance, May 1, 2008, for U.S. Appl. No. 10/938,205, filed Sep. 9, 2004 by Gorelik et al., Total 18 pp. [EXE-002 (NOA)].

Notice of Allowance, Aug. 10, 2011, for U.S. Appl. No. 12/283,477, filed Sep. 12, 2008 by Gorelik et al., Total 14 pp.

Office Action 1, Apr. 26, 2011, for U.S. Appl. No. 12/283,477, filed Sep. 12, 2008 by Gorelik et al., Total 24 pp.

International Preliminary Report, Mar. 13, 2006, for PCT/US2004/029631, Total 4 pp.

Written Opinion, Mar. 10, 2006, for PCT/US04/29631, Total 3 pp.

International Search Report, Mar. 23, 2006, for PCT/US2004/029631, Total 3 pp.

Preliminary Amendment, Dec. 9, 2009, for U.S. Appl. No. 12/283,477, filed Sep. 12, 2008 by Gorelik et al., Total 8 pp.

Response to Restriction Requirement, Apr. 19, 2011, for U.S. Appl. No. 12/283,477, filed Sep. 12, 2008 by Gorelik et al., Total 1 p.

Restriction Requirement, Jun. 18, 2007, for U.S. Appl. No. 10/938,205, filed Sep. 9, 2004 by Gorelik et al., Total 7 pp. [EXE-002 (RestReq)].

Restriction Requirement, Mar. 23, 2011, for U.S. Appl. No. 12/283,477, filed Sep. 12, 2008 by Gorelik et al., Total 10 pp.

Response to Restriction Requirement, Aug. 17, 2007, for U.S. Appl. No. 10/938,205, filed Sep. 9, 2004 by Gorelik et al., Total 4 pp. [EXE-002 (RspRestReq)].

Restriction Requirement 2, Feb. 13, 2008, for U.S. Appl. No. 10/938,205, filed Sep. 9, 2004 by Gorelik et al., Total 7 pp. [EXE-002 (RestReq2)].

Response to Restriction Requirement 2, Mar. 12, 2008, for U.S. Appl. No. 10/938,205, filed Sep. 9, 2004 by Gorelik et al., Total 4 pp. [EXE-002 (RspRestReq2)].

Amendment 1, Nov. 29, 2012, for U.S. Appl. No. 13/267,292, filed Oct. 6, 2011 by A. Gorelik et al., Total 6 pp. [57.304D1 (Amend1)].

* cited by examiner

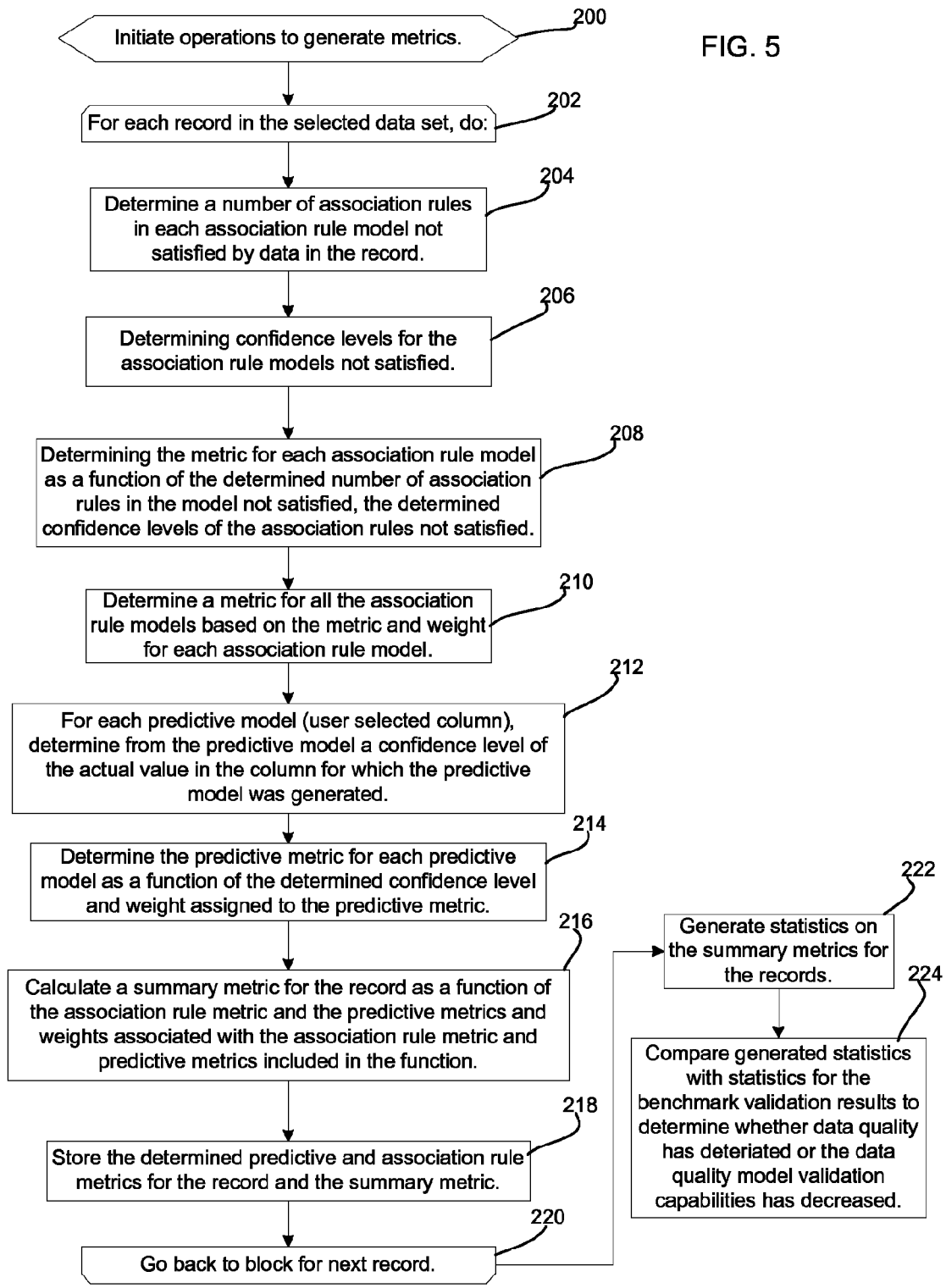

MANAGING VALIDATION MODELS AND RULES TO APPLY TO DATA SETS

1. Field

The present invention relates to a method, system, and article of manufacture for managing validation models and rules to apply to data sets.

2. Description of the Related Art

Data records in a database may be processed by a rule evaluation engine applying data rules to determine data records that have column or field values that deviate from the values that are expected by the rules. In the current art, the user manually codes data rules by first analyzing the data visually or using a profiling tool to obtain an understanding of the pattern of a well-formed record. Next a user builds logical expressions that define a set of rules to describe the normal characteristics of records in the set. These rules are then repeatedly executed against data sets to flag records that fail the conditions specified by the data rules and report on trends in failure rates over time.

A user may use a rule editor user interface to create new data rules or modify existing rules. Rules may be expressed in a rule language, such as BASIC, Structured Query Language (SQL), Prolog, etc. The user may then save rules in a rule repository in the rule language or in a common rule format. The user may then select rules from the rule repository and a data set of records to provide to the rule evaluation engine to execute the selected rules against the selected data records to validate the data, capture the results and display the results to the user.

Developing data rules can require a significant amount of user time, effort and skill to analyze patterns in data, especially for large data sets having millions of records with hundreds of columns. Data rules are often treated as individual objects that express conditions as a set of Boolean expressions that any given record in the data set will either satisfy or not satisfy and actions to take based on the result of the test of an individual record. The built rules may be stored atomically in a repository, and the validation and monitoring runtime systems test the conditions of each rule and (optionally) take action for every record in the data set.

There is a need in the art for improved techniques for managing rules in a rules repository.

SUMMARY

Provided are a method, system, and article of manufacture for managing validation models and rules to apply to data sets. A schema definition describing a structure of at least one column in a first data set having a plurality of columns and records providing data for each of the columns is received. At least one model is generated, wherein each model asserts conditions for at least one column in a record of the first data set. The schema definition and the at least one model are stored in a data quality model. Selection is received of a second data set and the data quality model. A determination is made as to whether a structure of the second data set is compatible with the schema definition in the selected data quality model. Each model in the data quality model is applied to the records in the second data set to validate the records in the second data set in response to determining that the structure of the second data set and the schema definition are compatible.

In a further embodiment, generating the at least one model comprises using a data mining algorithm to generate at least one association model, wherein each association model includes at least one rule predicting a value in one column based on at least one value in at least one predictor column.

In a further embodiment, generating the at least one model comprises receiving user selection of at least one column in the first data set and using a data mining algorithm to generate a predictive model for each selected column predicting a probability of values in the selected column.

In a further embodiment, each generated model is applied to each record in the first data set to validate each record based on a result of applying each generated model to the columns of the record to generate benchmark statistics for the data quality model. The benchmark statistics are stored with the data quality model. Statistics on the records of the second data set are generated in response to applying each model in the data quality model to the records in the second data set. The generated statistics for the second data set are compared with the benchmark statistics to compare differences in data quality between the second data set and the first data set.

In a further embodiment, generating the first model comprises using a first data mining algorithm to generate at least one model to validate values in at least one column in the records of the first data set and using a second data mining algorithm to generate at least one model to validate values in at least one column in the records of the first data set. Applying each model in the data quality model to the records in the second data set comprises determining a metric for each result of applying the models generated by the first and second data mining algorithms for each record in the second data set and generating a summary metric for each record in the second data set that is a function of the metrics resulting from applying the models to the record.

In a further embodiment, generating the summary metric for each record in the second data set further comprises applying a weighting to each metric and summing the weighted metrics to generate the summary metric for the record.

In a further embodiment, the models generated by the first data mining algorithm comprise a plurality of association rule models. Each association rule model includes at least one association rule to predict a value in one column based on at least one value in at least one predictor column. The models generated by the second data mining algorithm comprise a predictive model predicting values in a user selected column. Determining the metrics for each record in the second data set comprises: determining for each association model association rules not satisfied by the data in the record; for each association rule model having association rules not satisfied by data in the record, determining an association rule model metric as a function of statistical values of the association rules in the association rule model not satisfied; determining from the predictive model a confidence level of a value in each column predicted by one predictive model; determining a predictive model metric for each predictive model as a function of the determined confidence level for each predictive model applied to the record.

In a further embodiment, the statistical values comprise at least one of a confidence level, support and/or lift. A summary metric is generated for each record in the second data set as a function of the determined association rule model metrics and the predictive model metrics.

In a further embodiment, weights associated with the association rule models and predictive models are used in the functions to determine the metrics for the association rule models and the predictive models.

In a further embodiment, the schema definition specifies a data type and column name for selected columns in the first data set. Data in at least one column in the second data set that is not compatible with one column format specified in the schema definition is transformed to a format compatible with the structure of the schema definition in response to determining that the structure of the second data set is incompatible with the schema definition in the selected data quality model, wherein the models are applied to the transformed data in the second data set.

In a further embodiment, generating the at least one model comprises using a data mining algorithm to generate a set of a plurality of rules, wherein each rule predicts a value in one column based on at least one value in at least one predictor columns Redundant rules are determined and removed to produce a modified set of rules.

BRIEF DESCRIPTION OF THE DRAWINGS

FIG. 5 illustrates an embodiment of operations to generate metrics for the models applied to the records in the selected data set.

DETAILED DESCRIPTION

Figure 1:
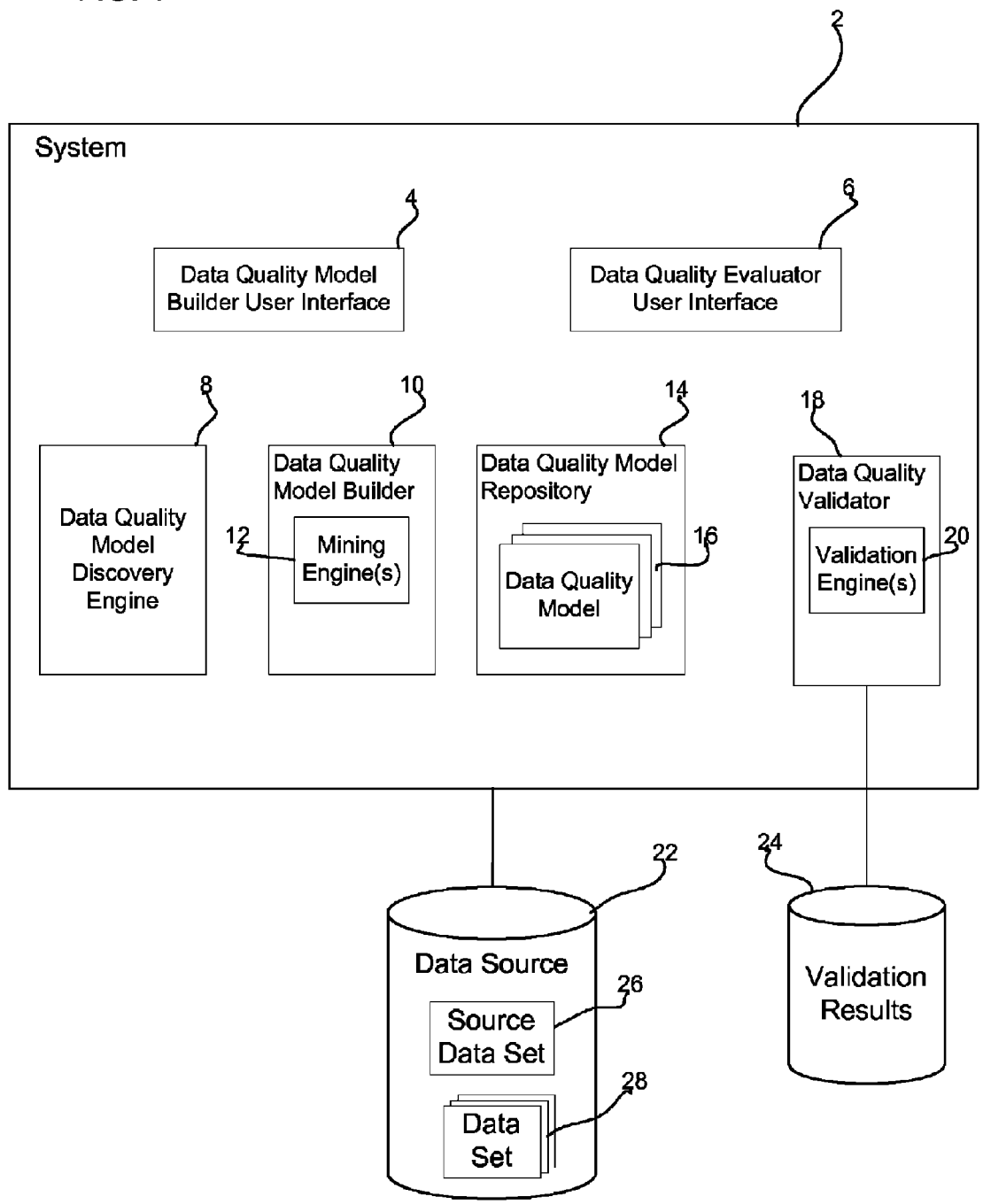
FIG. 1 illustrates an embodiment of a computing environment.

FIG. 1 illustrates a computing environment in which embodiments may be implemented. A system 2 includes program components comprising a data quality model builder user interface (UT) 4, a data quality evaluator user interface (UT) 6, a data quality model discovery engine 8, a data quality model builder 10 including one or more data mining engines 12, data quality model repository 14 including one or more data quality models 16, a data quality validator 18, and validation engines 20. The program components may comprise software components that are loaded into a memory in the system 2 and executed by a processor of the system 2. The system is further coupled to a data source 22 that includes data source and records, where the records may have one or more fields. The data source 22 may be implemented in a computer readable medium, such as a storage device. Validation results 24, which may be implemented in a computer readable medium, comprise the metrics and results from applying the models in a data quality model 16 to data sets 28 in the data source 22. The data source 22 stores a plurality of data sets, or database tables, including a source data set 26 from which a data quality model 16 is generated and data sets 28 the user may select to validate using one stored data quality model 16.

A user may invoke the data quality model builder UI 4 to invoke the data quality model builder 10 to construct a data quality model 16 and store the constructed data quality model 16 in the data quality model repository 14. The data quality model discovery engine 8 may be used to access data quality models 16 stored in the data quality model repository 14.

Figure 2:
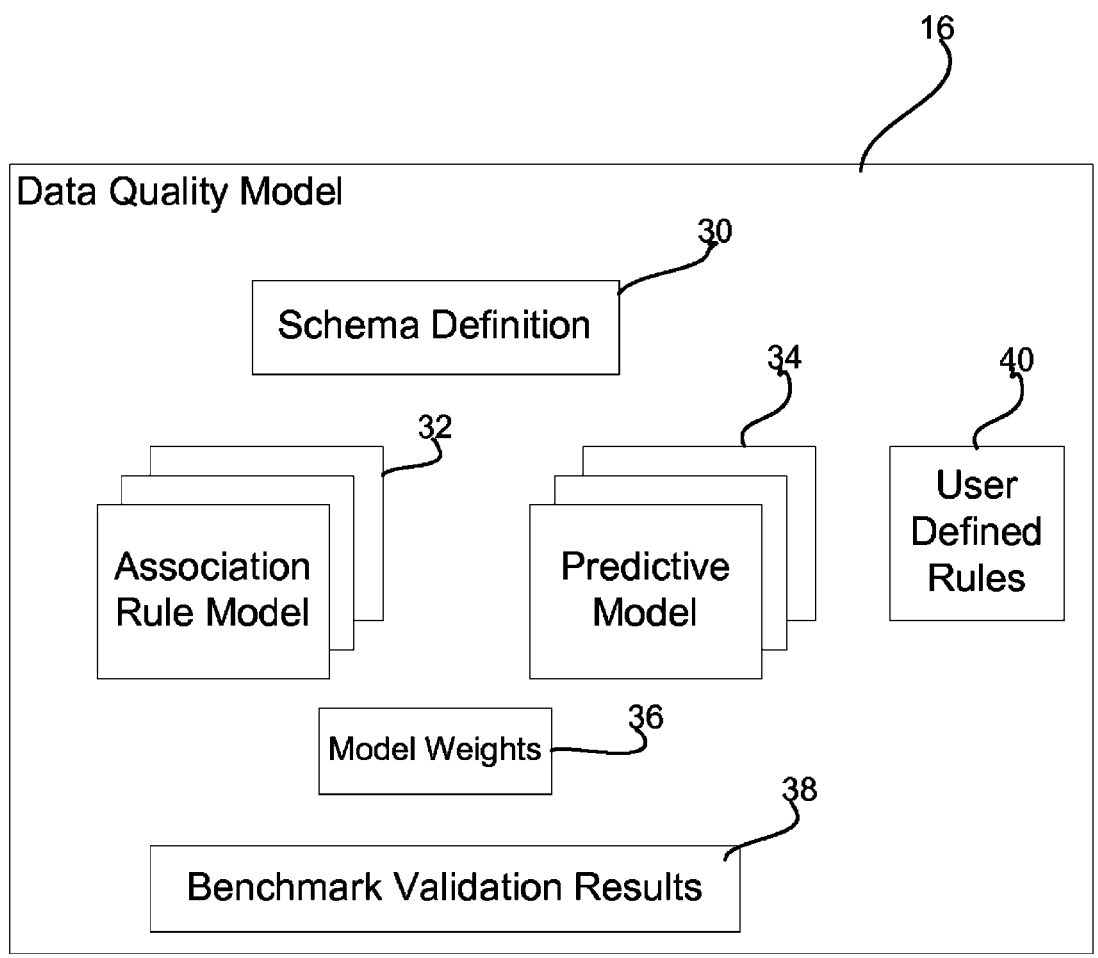
FIG. 2 illustrates an embodiment of a data quality model.

FIG. 2 illustrates an embodiment of a data quality model 16 data structure including a schema definition 30 providing a format of one or more columns in the selected source data set 26 for which the data quality model is constructed. The schema definition 30 may indicate a name and data type for columns in the source data set 26. The schema definition 30 may provide format information for all or less than all the columns in the source data set 26. The data quality model 16 further includes a plurality of rule models generated according to one or more data mining engines 12 or user defined rules to apply to the columns of the source data set 26 from which the data quality model 16 is generated.

In the embodiment of FIG. 2, two types of models are shown, association rule models 32 comprising rules generated using a data mining engine 12 implementing an association rules algorithm and predictive models 34 generated using a data mining engine 12 implementing a predictive algorithm (e.g., tree classification, regression, . . . ). An association rule model 32 contains one or more association rules. Those association rules describe all the relationships that may exist between all the columns and that satisfy a minimum confidence, support, lift and a maximum rule length specified by the user. The determined relationships may specify relationships for one or more predictor columns and a predicted column to provide a prediction of the predicted column value based on values in one or more predictor columns. Each association rule in an association rule model 34 specifies different values for the one or more predictor columns and the predicted column. A predictive model 34 provides probabilities or likelihoods of predicted values of a specific target column. The user may specify the columns in the source data set 26 for which predictive models 34 are generated.

The data quality model 16 may further store user or default weights 36 for each model 32 and 34 indicating a weight to apply to the model results to calculate metrics for records in a validated data set. Benchmark validation statistics 38 comprise the statistical results and metrics of applying the generated models 32 and 34 to the source data set 26, which indicates the extent to which the records of the source data set 26 have column values that deviate from what is expected according to the generated models 32 and 34.

The data mining engines 12 may comprise data mining engines known and available in the art. Each data mining engine 12 implements one or more data mining functions/algorithms that analyze data to produce data mining models, which may be in a known format such as the Predictive Model Markup Language (PMML). An data mining engine 12 implementing an association rules algorithm may generate data rules that validate the values of data records in a table in the data source 22, e.g., IF [bank account=joint], THEN [marital status=married]. The data rules indicate one or more conditions for one or more predictive fields that infer within a defined confidence and support level predicted conditions of one predicted field. A predicted condition for a predicted field may specify a value, a range of values or specific values for a predicted field, e.g., age <18, salary >=40000, profession is in {a, b, c}, or other condition types known in the data mining art. A condition may comprise a condition other than a field, such as a root node of a tree model, such as for condition "IF [TRUE] THEN . . . ", meaning that the root node is always true. These rules may then be applied to data sets to determine field values that deviate from the rules and thus may be erroneous.

The association rules mining engine 12 may generate association models having rules with a confidence level, support level, lift, and rule length. A confidence level indicates a minimum probability at which one or more predictor conditions from predictive fields infer the predicted condition for the predicted field, i.e., the certainty in the records that are analyzed by the rule engine 10 that one or more fields predict a condition in another field. A support level indicates a minimum number or percentage of records of the analyzed records that must satisfy the determined data rule. A minimum lift value may be of the form lift (A->C)=confidence(A->C)/support(C), providing a measure of interest in the rule. Lift values greater than 1.0 indicate that transactions containing A tend to contain C more often than all transactions. The data mining engine 12 using a data mining association rules algorithm may generate all data rules that satisfy the specified confidence, support level, and lift.

One of the data mining engines 12 may use a data mining tree classification algorithm, tree regression, linear regression, etc. to generate predictive models from the data set. Predictive models are built and trained on sample data for individual columns, wherein one predictive model is built for each column of interest known as the target column. Once trained, the model can be used to predict the value of the target column, or to compute the probability that the target column has a specified value. For instance, the tree classification algorithm may build for one target column a model which contains a decision tree to predict the condition of this target column from the condition of the other columns. The association rules model may capture rules predicting the conditions of different columns, whereas a tree classification model may only predict the likelihood of values for one column, but can capture more complex conditions than the association rules algorithm.

A data quality model repository 14 stores generated data quality models 16. A data quality validator 18 includes one or more validation engine(s) 20 to apply the association rule 32 and predictive 34 models to determine metrics for the records in a selected validation data set 28. The resulting metrics for each record may be stored in the validation results 24. The user may use the data quality evaluator UI 6 to select a data set 28, a data quality model 16 to use to validate the selected data set 28, and to invoke the data quality validator 18 to run a validation engine 20 to apply the models 32 and 34 in the selected data quality model 16 to the selected data set 28.

Figure 3:
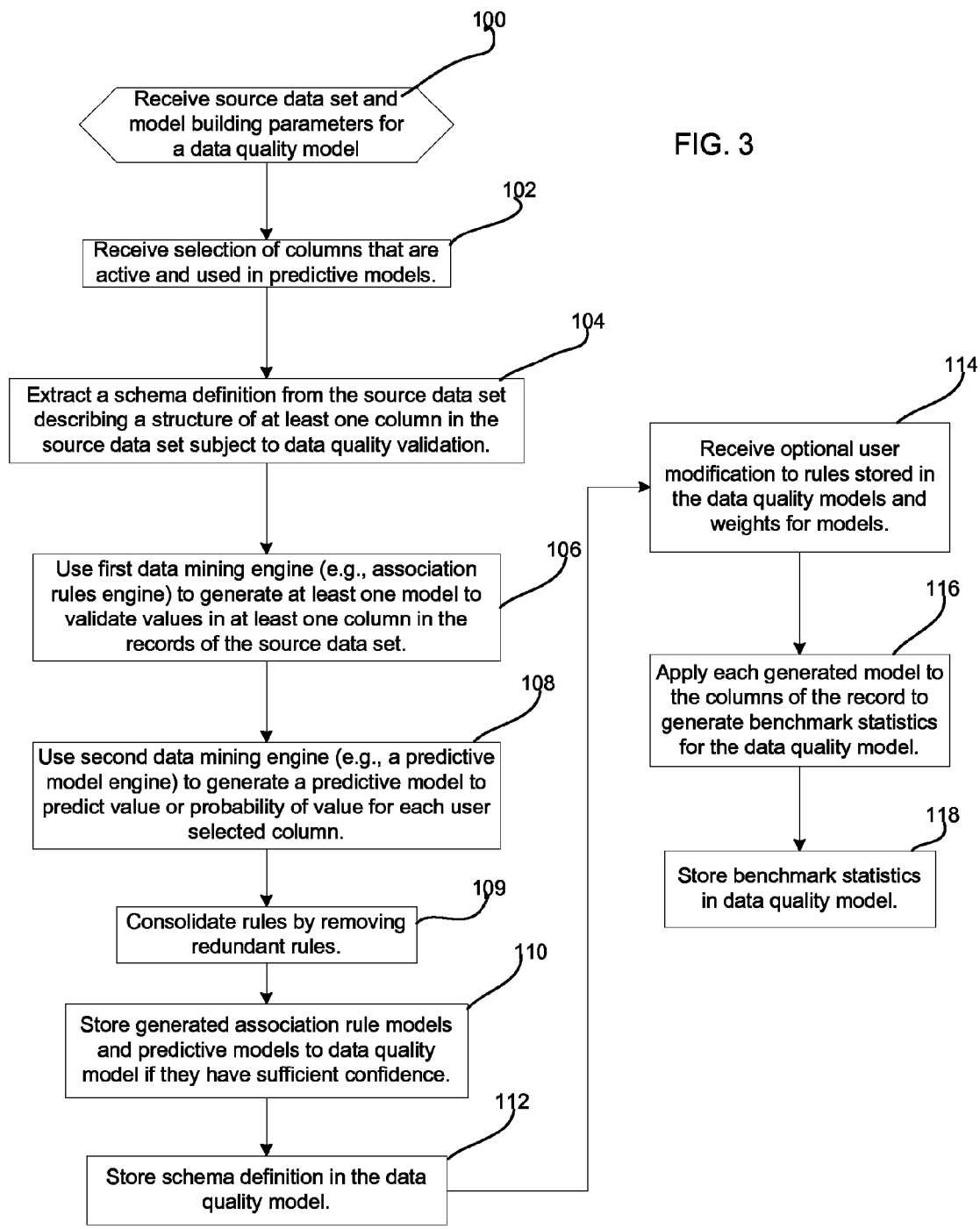
FIG. 3 illustrates an embodiment of operations to generate a data quality model

The data quality model 16 may further contain one or more user defined rules sets 40 created manually by the user or imported form a rules repository that may not follow the mining rule formats, but may still be used to validate the selected data set 28. manually FIG. 3 illustrates an embodiment of operations invoked by the user using the data quality model builder UI 4 to create a data quality model 16. The data quality model builder 10 receives (at block 100) a source data set and model building parameters for a data quality model 16 and receives (at block 102) selection of columns in the selected source data set 26 that are active, and optionally, options for each selected column indicating the type of analysis to perform on the column, e.g., whether a predictive model should be computed for a particular column. In response to the received information, the data quality model builder 10, operating either automatically or in response to user control via the data quality model builder UI 4 extracts (at block 104) a schema definition from the source data set describing a structure of at least one column in the source data set subject to data quality validation. The data quality model builder 10 uses (at block 106) a first data mining engine (e.g., association rules engine) to generate at least one model, e.g., association rule models 32, having rules to validate values in at least one column in the records of the source data set. In further embodiments, the data quality model builder 10 may only use one data mining engine 12 to construct the models or more than two data mining engines, such as a tree classification engine. In a further embodiment, the data quality model builder 10 may use (at block 108) a second type of data mining engine 12 (e.g., a predictive model engine) to generate a predictive model to predict values or probabilities of values for each user selected column.

The data quality model builder 10 may further discard (at block 109) redundant rules in an association rule model. A redundant rule is a rule of the form [a]+[b]=>[c] such that another rule [a]=>[c] already exists in the model with a similar confidence measure. In other words, the rule is redundant because the information contained in the rule is also fully contained in another rule, and the difference in the confidence between the simpler rule and the complex rule is not significant. In certain embodiments, the simpler rule is kept.

In the following example, rule (2) is redundant because rule (1) is simpler and contains the same information, e.g., the additional condition on bankcard does not affect the result.

(1) [marital_status=child]=>[profession=inactive] (97% confidence)

(2) [marital_status=child]+[bankcard=no]=>[profession=inactive] (96% confidence)

To determine if a rule r1=[body1]=>[head] is redundant, the data quality model builder 10 may search the list of rules for other rules r2=[body2]=>[head], such that r2 has the same [head] as r1. If [body1] fully includes [body2], then r2 is the simplest rule and r1 is the rule which will be ignored. Further, if r1 has a significantly higher confidence than r2, then both r1 and r2 may be used in the computation.

The data quality model builder 10 stores (at block 110) generated association rule models 32 and predictive models 34 in the data quality model 16 being constructed if they have sufficient predictive confidence. The data mining engines may compute metrics, such as confidence levels, for the predictive models. This metric may be computed by applying the computed model to the data set used to compute the model and then comparing how often application of the model to the same data set results in a correct prediction. Generated models that do not satisfy any user or default confidence levels may be discarded. The data quality model builder 10 further stores (at block 112) the provided schema definition 30 in the data quality model 16 being constructed.

The data quality model builder 10 may further receive (at block 114) user modifications to rules via the data quality model builder UI 4 or other rules and weights 36 for the models 32 and 34. The data quality model builder 10 may then invoke the data quality validator 18 to apply (at block 116) each generated model 32 and 34 to the columns of the records of the source data set 26 to generate benchmark statistics 36 for the data quality model 16. The benchmark statistics may be generated according to the operations of FIG. 5, where the statistics are generated from metrics calculated for each record in the source data set 26 by applying the models 32 and 34 to the data in the records. The benchmark statistics and metrics for each record in the source data set 26 are stored in the benchmark validation results 38.

Figure 4:
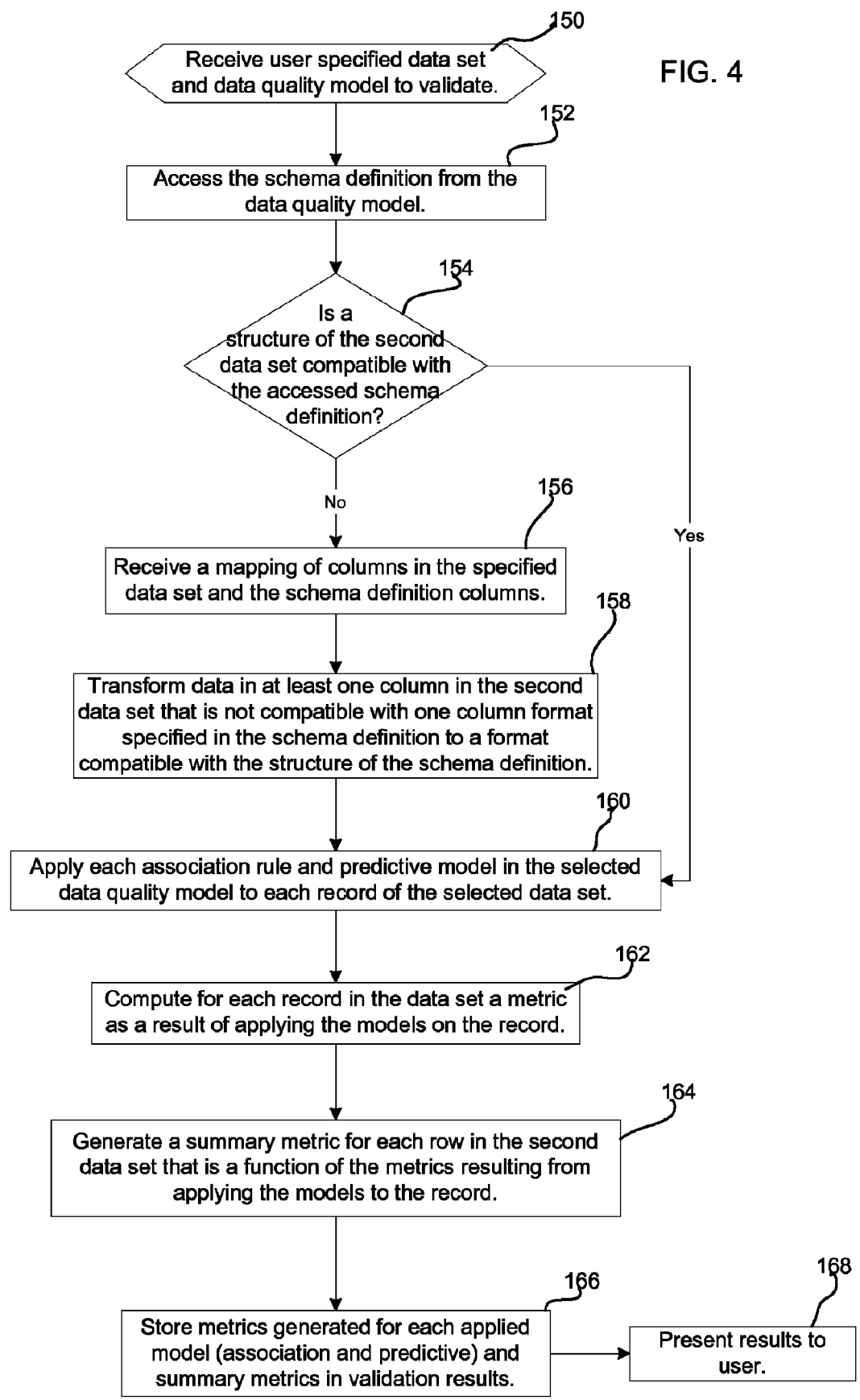
FIG. 4 illustrates an embodiment of operations to apply models in a data quality model to a selected data set.

FIG. 4 illustrates an embodiment of operations performed by the data quality validator 18 to validate a selected data set 28. Upon the data quality validator 18 receiving (at block 150) a user selected data set 28 and data quality model 16 to validate from the data quality evaluator UI 6, the data quality validator 18 accesses (at block 152) the schema definition 30 from the selected data quality model 16. If (at block 154) the structure of the selected data set 28 is not compatible with the accessed schema definition 30, i.e., the columns of the selected data set 28 do not have a same name and data type as the columns specified in the schema definition 30, then the data quality validator 18 may receive (at block 156) a mapping of columns in the specified data set and the schema definition columns from the data quality evaluator user interface 6, which may specify a transformation to perform on one or more columns in the selected data set 28 to make the selected data set 28 compatible with the data type for the column indicated in the schema definition 30. The data in at least one column in the selected data set 28 that is not compatible with one column format specified in the schema definition is transformed (at block 158) to a format compatible with the structure of the schema definition 30.

If (at block 154) the selected data set 28 is compatible with the schema definition 30 or after transforming the selected data set 28 (from block 158), control proceeds to block 160 where the data quality validator 18 invokes a validation engine 20 to apply each association rule model 32 and predictive 34 model in the selected data quality model 16 to each record of the selected data set. If the association rule model is comprised of multiple association rules, then applying the rule model 32 may comprise applying each association rule grouped in the association rule model 32. The validation engine 20 further computes (at block 162) for each record in the data set a metric for each result of applying the models 32 and 34 generated for each record in the data set 28. The metric may be based on a deviation of the actual values in the record from the value expected according to the applied models 32 and 34. The validation engine 20 may further generate (at block 164) a summary metric for each record in the second data set that is a function of the metrics resulting from applying the models 32 and 34 to the record.

The data quality validator 18 may store (at block 166) the metrics generated for each applied model (association 32 and predictive 34) and summary metrics in the validation results 24 for the data set 28. The results may further be presented (at block 168) to the user.

FIG. 5 illustrates a further embodiment of operations performed by the data quality validator 18 to apply the data quality model 16 to generate metrics for records in the source 26 and selected 28 data set and statistics on the deviation of metrics for each record. The operations of FIG. 5 may be performed at blocks 160-164 of FIG. 4 and block 116 in FIG. 3. Upon initiating operations to generate metrics for the records of the selected data set 28 (or source data set 26 used to create the data quality model 16), the data quality validator 18 validation engine 20 performs a loop of operations at blocks 202 through 218 for each record in the selected data set 28. At block 204, the validation engine 20 determines a number of association rule models 34 having association rules not satisfied by data in the record, i.e., the value in the predicted column in the record is not the predicted value based on values in other columns of the record. For each association rule model 32, the confidence levels of rules not satisfied are determined (at block 206). For each association rule model 34 having rules not satisfied, the validation engine 20 determines (at block 208) a metric for that association rule model for the record as a function of the confidence levels of the association rules not satisfied. For example, equation (1) below provides an example of how the metric for one association rule model is computed based on the confidence, support and lift for the rules ($r_j$) not satisfied.

$$MetricAM = \sum_{j=1}^{p} f(confidence(r_j), Support(r_j), Lift(r_j)) \quad (1)$$

Equation (2) below provides a further embodiment for determining the MetricAM for one association rule model:

$$MetricAM = \sum_{j=1}^{p} -\log(1 - Confidence(r_j)) \quad (2)$$

The metric for the association rule model—MetricAM comprises the sum of the negative logs of one minus the confidence level of each association rule in the model (AM) not satisfied, where $r_j$ comprises the association rule in the model not satisfied, where there are p rules not satisfied.

Equation (3) below provides yet a further embodiment for determining the MetricAM for one association rule model:

$$MetricAM = \left(\sum_{j=1}^{p} Confidence(r_j)\right) / N, \quad (3)$$

where N is the total number of association rules in the model.

The validation engine 20 may further determine (at block 210) a summary metric for all the association rule models based on the determined metric and weight for each association rule model. A summary metric for all the association rule models 32 having rules not satisfied may be calculated according to equation (4) below using the weights 36 for the association rule models:

$$Metric_{assoc} = \frac{\sum_{i=1}^{n} MetricAM_i \cdot weight_i}{\sum_{i=1}^{n} Weight_i} \quad (4)$$

The Metric$_{assoc}$ comprises a summary metric for all association rule models for a data record comprising the sum of the metricAM$_i$ for each association rule model, where metricAM$_i$ for one association rule model is calculated using equation (1) above. The metricAM of association rule models having no rules not satisfied by the record is zero. In equation (2) the metricAM for each association rule model is multiplied by the weight for that association rule model, for association rule models 1 through n.

For each predictive model (user selected column), the validation engine 20 may determine (at block 212) from the predictive model a confidence level, i.e., probability, for the actual value in the column of the record for the predictive model. The validation engine 20 may further determine (at block 214) a predictive metric for all the predictive metrics as a function of the determined confidence level for the actual value and weight for each predictive model.

Equation (5) below provides an embodiment for calculating a metric for all the predictive models (Metric$_{pred}$) as a sum for all predictive models, for i=1 to n, of the functions of the confidence for the actual value in the column (r) according to the predictive model and the weight for that predictive model:

$$Metric_{pred} = \frac{\sum_{i=1}^{n} f(confidence(ActualValue(r_i))) \cdot weight_{pred(i)}}{\sum_{i=1}^{n} Weight_{pred(i)}} \quad (5)$$

Equation 6 below provides an alternative embodiment for calculating the metric for the predictive model as a sum of the negative log of one minus the confidence value for the actual value in the column weighted by the weight for the predictive model for all predictive models i=1 to n.

$$Metric_{pred} = \frac{\sum_{i=1}^{n} -\log(1 - confidence(ActualValue(r_i))) \cdot weight_{pred(i)}}{\sum_{i=1}^{n} Weight_{pred(i)}} \quad (6)$$

Equation 7 below provides a yet further alternative embodiment for calculating the metric for the predictive model as a sum of one minus the confidence value for the actual value in the column weighted by the weight for the predictive model for all predictive models i=1 and divided by the sum of the weights for all the predictive models.

$$Metric_{pred(i)} = \frac{\sum_{i=1}^{n} (1 - confidence(ActualValue(r_i))) \cdot weight_{pred(i)}}{\sum_{i=1}^{n} (weight_{pred(i)})} \quad (7)$$

The validation engine 20 may further calculate (at block 216) a summary metric for the record as a function of the association rule metric and the predictive metrics and weights associated with the association rule metric and predictive metrics included in the function. Equation (8) below provides an embodiment for calculating an aggregate summary metric (Metric) using summary weights with the summary metric for the predictive models 34 and summary metric for the association rule models 32.

$$Metric = \frac{metric_{assoc} \cdot weight_{assoc} + metric_{pred} \cdot weight_{pred}}{weight_{assoc} + weight_{pred}} \quad (8)$$

The determined predictive and association rule metrics and summary metric for the record is stored (at block 218).

The data quality validator 18 may further generate (at block 222) statistics based on the metrics for the data records of the data set 28 which may comprise a distribution of the metrics for each record in the data set 28. The data quality validator 18 may further compare (at block 224) the statistics of the deviations in the benchmark validation results 38 and those deviations calculated for the selected data set 28. The deviations compared may comprise deviations at a summary metric level, the predictive model metrics for the records and the association rule model metrics for the records.

Significant increases in the deviations of the record metric between the benchmark validation statistics and those generated from a subsequently selected data set 28 to which the data quality model is applied may indicate either problems in the data set or that the data quality model 16 is outdated and no longer suitable for validating data.

Described embodiments provide techniques to generate a data quality model comprising one or more rule models generated using data mining and other algorithms to validate data in data sets. The described embodiments provide techniques to gather benchmark and other statistics for data which may be used to determine whether the data in subsequently tested data sets has errors or whether the models included in one data quality model are no longer useful for validating data.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving a schema definition describing a structure and a format of at least one column in a first data set having a plurality of columns and records providing data for each of the columns;
   generating at least one model, wherein each model asserts conditions for the at least one column in the first data set whose structure is described in the schema, wherein the rules for each model validate values in the at least one column;
   storing the schema definition and the at least one model in a data quality model, wherein the data quality model comprises a data structure;
   receiving selection of a second data set and the data quality model;
   determining whether a structure of at least one column in the second data set is compatible with the at least one column described in the schema definition in the selected data quality model;
   applying the rules in each model in the data quality model to records in the at least one column of the second data set to validate the records in the at least one column in the second data set in response to determining that the structure of the second data set and the schema definition are compatible.

2. The method of claim 1, wherein generating the at least one model comprises using a data mining algorithm to generate at least one association model, wherein each association model includes at least one rule predicting a value in one column based on at least one value in at least one predictor column.

3. The method of claim 1, wherein generating the at least one model comprises:
   receiving user selection of at least one column in the first data set; and
   using a data mining algorithm to generate a predictive model for each selected column predicting a probability of values in the selected column.

4. The method of claim 1, further comprising:
   applying each generated model to each record in the first data set to validate each record based on a result of applying each generated model to the columns of the record to generate benchmark statistics for the data quality model;
   storing the benchmark statistics with the data quality model;
   generating statistics on the records of the second data set in response to applying each model in the data quality model to the records in the second data set; and
   comparing the generated statistics for the second data set with the benchmark statistics to compare differences in data quality between the second data set and the first data set.

5. The method of claim 1,
   wherein generating the at least one model comprises:
      using a first data mining algorithm to generate at least one model to validate values in at least one column in the records of the first data set;
      using a second data mining algorithm to generate at least one model to validate values in at least one column in the records of the first data set;
   wherein applying each model in the data quality model to the records in the second data set comprises:
      determining a metric for each result of applying the models generated by the first and second data mining algorithms for each record in the second data set; and
      generating a summary metric for each record in the second data set that is a function of the metrics resulting from applying the models to the record.

6. The method of claim 5, wherein generating the summary metric for each record in the second data set further comprises:
   applying a weighting to each metric; and
   summing the weighted metrics to generate the summary metric for the record.

7. The method of claim 5, wherein the models generated by the first data mining algorithm comprise a plurality of association rule models, wherein each association rule model includes at least one association rule to predict a value in one column based on at least one value in at least one predictor column, and wherein the models generated by the second data mining algorithm comprise a predictive model predicting values in a user selected column;
   wherein determining the metrics for each record in the second data set comprises:
      determining for each association model association rules not satisfied by the data in the record;
      for each association rule model having association rules not satisfied by data in the record, determining an association rule model metric as a function of statistical values of the association rules in the association rule model not satisfied;

determining from the predictive model a confidence level of a value in each column predicted by one predictive model;

determining a predictive model metric for each predictive model as a function of the determined confidence level for each predictive model applied to the record.

8. The method of claim 7, wherein the statistical values comprise at least one of a confidence level, support and/or lift further comprising:

generating a summary metric for each record in the second data set as a function of the determined association rule model metrics and the predictive model metrics.

9. The method of claim 8, wherein weights associated with the association rule models and predictive models are used in the functions to determine the metrics for the association rule models and the predictive models.

10. The method of claim 1, wherein the schema definition specifies a data type and column name for selected columns in the first data set, further comprising:

transforming data in at least one column in the second data set that is not compatible with one column format specified in the schema definition to a format compatible with the structure of the schema definition in response to determining that the structure of the second data set is incompatible with the schema definition in the selected data quality model, wherein the models are applied to the transformed data in the second data set.

11. The method of claim 1, wherein generating the at least one model comprises using a data mining algorithm to generate a set of a plurality of rules, wherein each rule predicts a value in one column based on at least one value in at least one predictor column, further comprising:

determining redundant rules; and removing the determined redundant rules to produce a modified set of rules.

12. A system, comprising:

a data quality model builder to cause operations, the operations comprising:

receiving a schema definition describing a structure and a format of at least one column in a first data set having a plurality of columns and records providing data for each of the columns;

generating at least one model, wherein each model asserts conditions for the at least one column in the first data set whose structure is described in the schema, wherein the rules for each model validate values in the at least one column;

storing the schema definition and the at least one model in a data quality model, wherein the data quality model comprises a data structure; and a data quality validator to cause operations, the operations comprising:

receiving selection of a second data set and the data quality model;

determining whether a structure of the at least one column in the second data set is compatible with at least one column described in the schema definition in the selected data quality model;

applying the rules in each model in the data quality model to records in the at least one column of the second data set to validate the records in the at least one column in the second data set in response to determining that the structure of the second data set and the schema definition are compatible.

13. The system of claim 12, wherein the data quality model builder generates the at least one model by using a data mining algorithm to generate at least one association model, wherein each association model includes at least one rule predicting a value in one column based on at least one value in at least one predictor column.

14. The system of claim 12, wherein the data quality model builder generates the at least one model by:

receiving user selection of at least one column in the first data set; and using a data mining algorithm to generate a predictive model for each selected column predicting a probability of values in the selected column.

15. The system of claim 12, wherein the data quality validator further causes operations comprising:

applying each generated model to each record in the first data set to validate each record based on a result of applying each generated model to the columns of the record to generate benchmark statistics for the data quality model;

storing the benchmark statistics with the data quality model;

generating statistics on the records of the second data set in response to applying each model in the data quality model to the records in the second data set; and comparing the generated statistics for the second data set with the benchmark statistics to compare differences in data quality between the second data set and the first data set.

16. The system of claim 12, wherein the data quality model builder generates the at least one model by:

using a first data mining algorithm to generate at least one model to validate values in at least one column in the records of the first data set;

using a second data mining algorithm to generate at least one model to validate values in at least one column in the records of the first data set; and wherein the data quality validator applies each model in the data quality model to the records in the second data set by:

determining a metric for each result of applying the models generated by the first and second data mining algorithms for each record in the second data set; and generating a summary metric for each record in the second data set that is a function of the metrics resulting from applying the models to the record.

17. The system of claim 16, wherein generating the summary metric for each record in the second data set further comprises:

applying a weighting to each metric; and summing the weighted metrics to generate the summary metric for the record.

18. The system of claim 16, wherein the models generated by the first data mining algorithm comprise a plurality of association rule models, wherein each association rule model includes at least one association rule to predict a value in one column based on at least one value in at least one predictor column, and wherein the models generated by the second data mining algorithm comprise a predictive model predicting values in a user selected column;

wherein the data quality validator determines the metrics for each record in the second data set by:

determining for each association model association rules not satisfied by the data in the record;

for each association rule model having association rules not satisfied by data in the record, determining an association rule model metric as a function of statistical values of the association rules in the association rule model not satisfied;

determining from the predictive model a confidence level of a value in each column predicted by one predictive model;

determining a predictive model metric for each predictive model as a function of the determined confidence level for each predictive model applied to the record.

19. The system of claim 12, wherein the schema definition specifies a data type and column name for selected columns in the first data set, wherein the data quality validator further causes operations comprising:

transforming data in at least one column in the second data set that is not compatible with one column format specified in the schema definition to a format compatible with the structure of the schema definition in response to determining that the structure of the second data set is incompatible with the schema definition in the selected data quality model, wherein the models are applied to the transformed data in the second data set.

20. An article of manufacture including code to cause operations to be performed, the operations, comprising:

receiving a schema definition describing a structure and a format of at least one column in a first data set having a plurality of columns and records providing data for each of the columns;

generating at least one model, wherein each model asserts conditions for the at least one column in the first data set whose structure is described in the schema, wherein the rules for each model validate values in the at least one column;

storing the schema definition and the at least one model in a data quality model, wherein the data quality model comprises a data structure;

receiving selection of a second data set and the data quality model;

determining whether a structure of at least one column in the second data set is compatible with at least one column described in the schema definition in the selected data quality model;

applying the rules in each model in the data quality model to the records in the at least one column of the second data set to validate the records in the at least one column in the second data set in response to determining that the structure of the second data set and the schema definition are compatible.

21. The article of manufacture of claim 20, wherein generating the at least one model comprises using a data mining algorithm to generate at least one association model, wherein each association model includes at least one rule predicting a value in one column based on at least one value in at least one predictor column.

22. The article of manufacture of claim 20, wherein generating the at least one model comprises:

receiving user selection of at least one column in the first data set; and using a data mining algorithm to generate a predictive model for each selected column predicting a probability of values in the selected column.

23. The article of manufacture of claim 20, further comprising:

applying each generated model to each record in the first data set to validate each record based on a result of applying each generated model to the columns of the record to generate benchmark statistics for the data quality model;

storing the benchmark statistics with the data quality model;

generating statistics on the records of the second data set in response to applying each model in the data quality model to the records in the second data set; and comparing the generated statistics for the second data set with the benchmark statistics to compare differences in data quality between the second data set and the first data set.

24. The article of manufacture of claim 20, wherein generating the at least one model comprises:

using a first data mining algorithm to generate at least one model to validate values in at least one column in the records of the first data set;

using a second data mining algorithm to generate at least one model to validate values in at least one column in the records of the first data set;

wherein applying each model in the data quality model to the records in the second data set comprises:

determining a metric for each result of applying the models generated by the first and second data mining algorithms for each record in the second data set; and generating a summary metric for each record in the second data set that is a function of the metrics resulting from applying the models to the record.

25. The article of manufacture of claim 24, wherein generating the summary metric for each record in the second data set further comprises:

applying a weighting to each metric; and summing the weighted metrics to generate the summary metric for the record.

26. The article of manufacture of claim 24, wherein the models generated by the first data mining algorithm comprise a plurality of association rule models, wherein each association rule model includes at least one association rule to predict a value in one column based on at least one value in at least one predictor column, and wherein the models generated by the second data mining algorithm comprise a predictive model predicting values in a user selected column;

wherein determining the metrics for each record in the second data set comprises:

determining for each association model association rules not satisfied by the data in the record;

for each association rule model having association rules not satisfied by data in the record, determining an association rule model metric as a function of statistical values of the association rules in the association rule model not satisfied;

determining from the predictive model a confidence level of a value in each column predicted by one predictive model;

determining a predictive model metric for each predictive model as a function of the determined confidence level for each predictive model applied to the record.

27. The article of manufacture of claim 26, wherein the statistical values comprise at least one of a confidence level, support and/or lift further comprising:

generating a summary metric for each record in the second data set as a function of the determined association rule model metrics and the predictive model metrics.

28. The article of manufacture of claim 27, wherein weights associated with the association rule models and predictive models are used in the functions to determine the metrics for the association rule models and the predictive models.

29. The article of manufacture of claim 20, wherein the schema definition specifies a data type and column name for selected columns in the first data set, further comprising:

transforming data in at least one column in the second data set that is not compatible with one column format specified in the schema definition to a format compatible with the structure of the schema definition in response to determining that the structure of the second data set is incompatible with the schema definition in the selected data quality model, wherein the models are applied to the transformed data in the second data set.

30. The article of manufacture of claim 20, wherein generating the at least one model comprises using a data mining algorithm to generate a set of a plurality of rules, wherein each rule predicts a value in one column based on at least one value in at least one predictor column, further comprising:

determining redundant rules; and removing the determined redundant rules to produce a modified set of rules.

\* \* \* \* \*